United States Patent [19]

Heckles

[11] 4,217,396

[45] Aug. 12, 1980

[54] ACRYLATE-ACETOACETATE POLYMERS USEFUL AS PROTECTIVE AGENTS FOR FLOOR COVERINGS

[75] Inventor: John S. Heckles, Lancaster, Pa.

[73] Assignee: Armstrong Cork Company, Lancaster, Pa.

[21] Appl. No.: 38,010

[22] Filed: May 10, 1979

[51] Int. Cl.² .................... B32B 27/08; B32B 27/30; C08F 20/20; C08F 265/04

[52] U.S. Cl. .................... 428/500; 428/204; 428/520; 525/329; 525/386

[58] Field of Search ............ 428/500, 520; 525/329, 525/386

[56] References Cited

U.S. PATENT DOCUMENTS 4,147,686   4/1979   Heckler .................... 525/386

OTHER PUBLICATIONS

C.A. 87-54101.
C.A. 88-22225.
C.A. 87-117588.
C.A. 88-153645.

Primary Examiner—James C. Cannon
Attorney, Agent, or Firm—Dennis M. Kozak

[57] ABSTRACT

Cross-linked acrylate-acetoacetate polymers are disclosed. These polymers are prepared by the reaction of at least one polyfunctional acrylate with at least one diacetoacetate in the presence of a catalyst capable of promoting the reaction between the polyfunctional acrylate and the diacetoacetate. In a preferred embodiment, the polymers are employed to produce wear layer compositions for surface coverings.

18 Claims, No Drawings

ACRYLATE-ACETOACETATE POLYMERS USEFUL AS PROTECTIVE AGENTS FOR FLOOR COVERINGS

BACKGROUND OF THE INVENTION

This invention relates to polymers.

More specifically, this invention relates to acrylateacetoacetate copolymers and to coatings or films produced from these copolymers.

In one of its more specific aspects, this invention pertains to cross-linked copolymers which are the reaction products of polyfunctional acrylates and diacetoacetates.

The resilient flooring industry is continually searching for new abrasion-resistant polymeric compositions which will serve as wear layers for decorative surface coverings, especially thermoplastic floor coverings.

The present invention provides novel acrylate-acetoacetate polymers which exhibit excellent film-forming properties and abrasion-resistant properties. Accordingly, these polymers, in film form, are well suited for use as wear layers for decorative thermoplastic floor coverings.

According to this invention, there is provided a crosslinked acrylate-acetoacetate polymer produced by the reaction of at least one polyfunctional acrylate with at least one diacetoacetate in the presence of a catalyst capable of promoting the reaction between the polyfunctional acrylate and the diacetoacetate.

Also, according to this invention, there is provided a thermoplastic floor covering coated with a wear layer composition comprising a cross-linked acrylate-acetoacetate polymer produced by the reaction of at least one polyfunctional acrylate with at least one diacetoacetate in the presence of a catalyst capable of promoting the reaction between the polyfunctional acrylate and the diacetoacetate.

As the polyfunctional acrylate, use can be made of compounds having the formulae $$R(-O-C(O)-CH=CH_2)_4$$

$$R^1(-O-C(O)-CH=CH_2)_3, \text{ or}$$

$$R^2(-O-C(O)-CH=CH_2)_2$$

wherein R represents

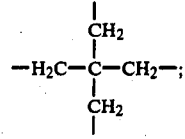

$R^1$ represents

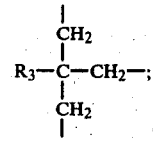

$R^2$ represents: a ($C_1$ to $C_{10}$) alkylene group, a ($C_1$ to $C_4$) alkyl substituted ($C_1$ to $C_{10}$) alkylene group,

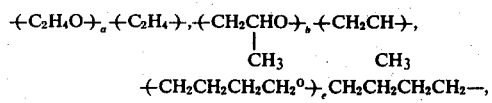

a cycloalkylene group, a cycloalkane bearing two ($C_1$ to $C_3$) alkylene groups,

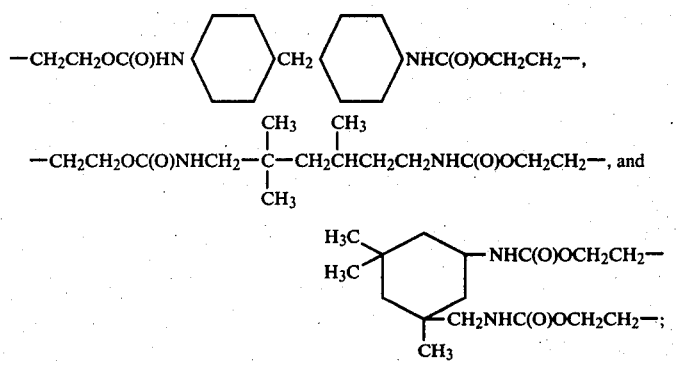

$R^3$ represents hydrogen or ($C_1$ to $C_3$) alkyl; a is an integer from 1 to 20; b is an integer from 1 to 10; and c is an integer from 1 to 5.

Representative of the above useable polyfunctional acrylates are trimethylol propane triacrylate, pentaerythritol tetraacrylate, hexanediol diacrylate, polyethylene glycol (200) diacrylate, ethylene glycol diacrylate, tripropyleneglycol diacrylate, trimethyl hexane diol diacrylate, 1,4-cyclohexanedimethanol diacrylate, dibutylene glycol diacrylate, 1,4-cyclohexane diacrylate, dipropyleneglycol di-2-acrylyl-ethyl ether, methylenebis(4-cyclohexane-2-acrylyl-ethyl urethane), 2,2,4-trimethylhexanebis(2-acrylyl-ethyl urethane), isophorone di(2-acrylyl-ethyl urethane), and the like.

The three above-recited urethane-containing diacrylates are not known to be commercially available. Accordingly, Examples III through V demonstrate the preparation of each urethane-containing diacrylate recited above.

As the diacetoacetate, use can be made of compounds having the formula

wherein R⁴ represents: a ($C_1$ to $C_{10}$) alkylene group, a ($C_1$ to $C_4$) alkyl substituted ($C_1$ to $C_{10}$) alkylene group,

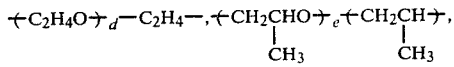

a cycloalkylene group, a cycloalkane bearing two ($C_1$ to $C_3$) alkylene groups, and $-H_6C_3O+C_2H_4O)_f-+C_2H_4)-OC_3H_6-$, d is an integer from 1 to 6; e is an integer from 1 to 6; and f is an integer from 1 to 4.

Representative of the above usable diacetoacetates are diethylene glycol di-3-acetoacetate propyl ether, hexanediol-diacetoacetate, 1,4 cyclohexanebis(methylacetoacetate), 1,3 cyclohexanebis (methylacetoacetate), 2,2,4-trimethylhexamethylenediacetoacetate, 1,3-propanediacetoacetate, diethyleneglycol-di-2-acetoacetate-ethyl ether, dipropyleneglycol diacetoacetate propyl ether, 1,4-cyclohexanebis (acetoacetate), trimethylhexamethylene diacetoacetate, and the like.

The diacetoacetates are not known to be commercially available. Accordingly, Examples 1 and 2 below demonstrate methods for preparing diacetoacetates suitable for use in this invention.

The amounts of polyfunctional acrylate and diacetoacetate can be varied within relatively wide ranges. Preferably, about 1 to about 2 moles of diacrylate, about ⅔ mole to about 1⅓ moles of triacrylate or about ½ mole to about 1 mole of tetroacrylate are employed for every mole of diacetoacetate. Best results are usually obtained when the polyfunctional acrylate (based on diacrylate) is reacted with the diacetoacetate in a mole ratio of from about 1.2 to about 1.4 moles of diacrylate to about 1 mole of diacetoacetate.

As the catalyst to promote the reaction, a Michael reaction, use can be made of any of a variety of well known Michael reaction-type catalysts commonly employed to promote condensation. Particularly suitable are strong basic catalysts such as sodium methoxide, sodium metal, sodium ethylate, benzyl-trimethyl ammonium methoxide, and the like. Catalytic amounts of materials are selected in accordance with well known practices in the polymer art, the amount being one sufficient to promote the polycondensation reaction. For further information relating to the Michael reaction mechanism, see "The Michael Reaction" by E. D. Bergmann et al., *Organic Reactions*, Vol. 10, chapter 3, pages 179–555, and *Modern Synthetic Reactions*, H. O. House, 2nd Ed. (1972), pages 595–623, both herein incorporated by reference.

The polymerization reaction can be carried out using the reactants as the only reaction medium since both the polyfunctional acrylates and the diacetoacetates are normally in the liquid state and/or they can be uniformly blended together.

In one embodiment of this invention, if the acrylate-acetoacetate polymer is employed to produce a wear layer composition, the polymerization reaction can be carried out in the presence of art recognized amounts of optional ingredients typically employed in wear layer compositions such as surfactants, heat and light stabilizers, and the like.

The following examples will serve to more fully illustrate specific embodiments of and the best mode for practicing this invention.

EXAMPLE I

This example demonstrates a method for the preparation of hexanediol diacetoacetate.

About 83 grams (0.7 mole) of hexanediol and about 0.4 gram of a catalyst (dibutyltin dilaurate) were added to a reaction vessel at room temperature with stirring.

The contents of the reaction vessel were heated to and maintained at a temperature within the range of about 85° to 95° C. and about 120 grams (1.4 moles) of diketene were added dropwise to the contents of the reaction vessel over a period of about 1 hour.

The temperature of the reaction vessel contents was held at about 80° C. for about 1 hour.

About 200 milliliters of methylene chloride were added to the contents of the reaction vessel with stirring to reduce the viscosity.

Propylamine was added to react with the unreacted diketene and the reaction product was transferred to a separatory funnel and acidified with dilute hydrochloric acid.

The reaction product was washed twice, once with about 250 milliliters of water and about 50 milliliters of saturated sodium chloride solution and a second time with about 250 milliliters of water, about 50 milliliters of saturated sodium bicarbonate solution and a sufficient amount (about 5 cc) of saturated $NaHCO_3$ solution to neutralize the separatory funnel contents to a pH of about 6.

After the second washing, the methylene chloride layer containing the reaction product was dried with anhydrous magnesium sulfate. The magnesium sulfate was filtered off. Methylene chloride was removed by vacuum distillation. And, the resulting product, hexanediol-diacetoacetate was recovered as a liquid in a yield of about 183 grams and observed to be light yellow in color.

EXAMPLE II

This example demonstrates the preparation of 1,4 cyclohexanebis(methyl-acetoacetate).

About 100 grams (0.7 mole) of 1,4-cyclohexane dimethanol and about 0.4 gram of catalyst (dibutyltin dilaurate) were added to a reaction vessel at room temperature with stirring.

The contents of the reaction vessel were heated and maintained at a temperature of about 85° to 95° C. and about 118 grams (1.4 moles) of diketene were added dropwise to the contents of the reaction vessel over a period of about 45 minutes.

The temperature of the reaction vessel contents was held at about 85° C. for about 2 hours.

About 200 milliliters of methylene chloride were added to the contents of the reaction vessel with stirring and the contents were cooled to about −5° C. at which temperature the resulting crude reaction product precipitated from the solution and was recovered by filtration.

The crude reaction product was purified by recrystallization from isopropyl alcohol, tested and found to have a melting point range of from 72° to about 74° C. and identified by N.M.R. spectrotometry as 1,4 cyclohexanebis(methyl acetoacetate).

EXAMPLE III

This example demonstrates the preparation of a urethane-containing diacrylate.

About 1 mole of methylenebis-4-cyclohexane isocyanate (designated "Hylene W", commercially available from E. I. DuPont de Nemours Co.) and about 2 moles of hydroxyethylacrylate and about 0.05 gram of dibutyltin catalyst were added to a reaction vessel at room temperature, with stirring. The temperature of the reaction vessel was increased to about 60° C. After about 3 hours, the resulting reaction product, methylenebis(4-cyclohexane-2-acryl-ethyl urethane), having the formula

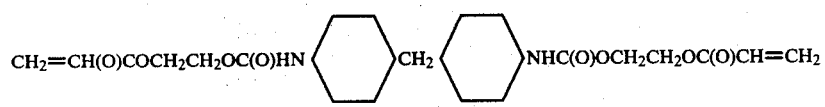

was recovered.

EXAMPLE IV

This example demonstrates the preparation of a urethane-containing diacrylate.

About 1 mole of 2,2,4-trimethylhexane diisocyanate (designated "TMDI", commercially available from Thorson Chemical Co.) and about 2 moles of hydroxyethylacrylate and about 0.05 gram of dibutyltin catalyst were added to a reaction vessel at room temperature, with stirring. The temperature of the reaction vessel was increased to about 60° C. After about 3 hours, the resulting reaction product, 2,2,4-trimethylhexane-bis(2-acrylyl-ethyl urethane), having the formula

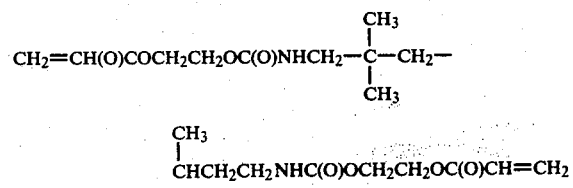

was recovered.

EXAMPLE V

This example demonstrates the preparation of a urethane-containing diacrylate.

About 1 mole of 3-isocyanatomethyl-3,5,5-trimethylcyclohexyl isocyanate (designated "IPDI" isophorone diisocyanate, commercially available from Thorson Chemical Co.) and about 2 moles of hydroxyethylacrylate and about 0.05 gram of dibutyltin catalyst were added to a reaction vessel at room temperature, with stirring. The temperature of the reaction vessel was increased to about 60° C. After about 3 hours, the resulting reaction product, isophorone di(2-acrylyl-ethyl urethane), having the formula

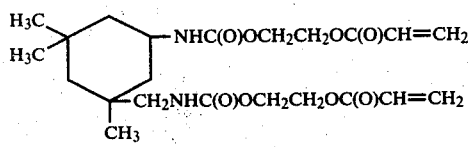

was recovered.

EXAMPLE VI

This example demonstrates the preparation of a 50—50 mixture of two urethane-containing diacrylates.

About 0.5 mole of "Hylene W," about 0.5 mole of "TMDI," about 2 moles of hydroxyethylacrylate and about 0.24 gram of a dibutyltin dilaurate catalyst were added to a reaction vessel at room temperature with stirring. The temperature was increased to about 60° C., and the reaction proceeded for about 3 hours. The resulting reaction product, a 50/50 mixture of methylenebis(4-cyclohexane-2-acrylyl-ethyl urethane)/2,2,4-trimethylhexanebis(2-acrylyl-ethyl urethane was recovered.

EXAMPLE VII

This example demonstrates the preparation of a polymer of this invention.

About 2.7 grams of hexanediol diacrylate, about 2.9 grams of the hexanediol diacetoacetate of Example I, and about 0.03 gram of a 40% by weight benzyltrimethyl ammonium methoxide in methanol catalyst solution were added to a reaction vessel at room temperature with stirring.

The resulting polymer mixture was transferred to an aluminum dish, found to be non-tacky after about 1 hour and was allowed to cure overnight at a temperature of about 70° C.

The resulting cured polymer was removed from the aluminum dish and observed to be clear and colorless. The cured polymer was tested by differential scanning calorimetery (DuPont 900 Thermal Analyzer) and found to have a Tg range of about −43° to about −33° C. with a Tg midpoint of about −38° C.

EXAMPLE VIII

The following ingredients were reacted using substantially the procedure of Example VII.

| Ingredients | Amount |
| --- | --- |
| hexanediol diacrylate | 3.2 grams |
| hexanediol diocetoacetate of Example 1 | 3.2 grams |
| 40% by weight benzyltrimethyl ammonium methoxide in methanol catalyst solution | 0.003 grams |

The resulting mixture was transferred to an aluminum dish and cured at about 70° C. for about 16 hours.

The resulting cured polymer was removed from the aluminum dish and observed to be clear and colorless. The cured polymer was tested and found to have a Tg range of about −31° to −19° C. with a Tg midpoint of about −25° C.

EXAMPLE IX

The following ingredients were reacted using substantially the procedure of Example VII.

| Ingredients | Amount |
| --- | --- |
| diethyleneglycol diacrylate | 2.6 grams |
| hexanediol diacetoacetate of Example I | 2.9 grams |
| 40% by weight benzyltrimethyl ammonium methoxide in methanol catalyst solution | 0.05 grams |

The resulting polymer was transferred to an aluminum dish and cured at about 70° C. for about 16 hours.

The resulting cured polymer was removed from the aluminum dish and observed to be clear and colorless.

The cured polymer was tested and found to have a Tg range of about −38° C. to −27° C. with a Tg midpoint of about −32° C.

The following Table I contains polymer Examples X through XV. All polymer compositions were prepared using substantially the procedure of Example VII and were catalyzed using about 1 percent by weight of the polymer composition of a 40% benzyltrimethyl ammonium methoxide in methanol solution.

Table I

Tg of Cured Acrylate-1,4 Cyclohexanebis (methylacetoacetate) Polymer Compositions

| Example No. | Ingredients and Amount (Moles) | Tg (°C.) Range | Tg (°C.) Midpoint |
|---|---|---|---|
| X | 1.0 HDDA[1] 1.0 CHBMAA[5] | −46; −35 | −40 |
| XI | 1.2 HDDA[1] 1.0 CHBMAA[5] | −18, −8 | −13 |
| XII | 1.4 HDBA[1] 1.0 CHBMAA[5] | −9, 2 | −3 |
| XIII | 1.2 BDA[2] 1.0 CHBMAA[5] | −21, 6 | −7 |
| XIV | 1.2 PEG200DA[3] 1.0 CHBMAA[5] | −26, −16 | −21 |
| XV | 1.2 DEGDA[4] 1.0 CHBMAA[5] | −16, −6 | −11 |

[1]HDDA - hexanedioldiacrylate
[2]BDA - butanediol diacrylate
[3]PEG200DA - polyethyleneglycol 200 diacrylate
[4]DEGDA - diethyleneglycol diacrylate
[5]CHBMAA - 1,4 cyclohexanebis (methylacetoacetate)

EXAMPLE XVI

This example demonstrates the preparation of a polymer of this invention using the urethane-containing diacrylate of Example IV.

About 4.5 grams of the urethane-containing diacrylate of Example IV, about 3.7 grams of 1,4 cyclohexanebis(methylacetoacetate) of Example II, and about 0.05 gram of a 40% by weight benzyltrimethyl ammonium methoxide in methanol catalyst solution were added to a reaction vessel at room temperature, with stirring.

The resulting polymer was transferred to an aluminum dish and allowed to cure for about 16 hours at a temperature of about 60° C.

The resulting cured polymer was removed from the aluminum dish and found to be tack-free, soft and tough with a Tg of about 0° C.

EXAMPLE XVII

This example demonstrates the preparation of a polymer of this invention using the urethane-containing diacrylate of Example III.

About 5.0 grams of the urethane-containing diacrylate of Example III, about 3.7 grams of 1,4 cyclohexanebis(methylacetoacetate) of Example II, and about 0.05 gram of a 40% by weight benzyltrimethyl ammonium methoxide in methanol catalyst solution were added to a reaction vessel at room temperature, with stirring.

The resulting polymer mixture was transferred to an aluminum dish and allowed to cure for about 16 hours at a temperature of about 60° C.

The resulting cured polymer was removed from the aluminum dish and found to be tack-free, soft and tough with a Tg of about 0° C.

EXAMPLE XVIII

This example demonstrates the preparation of a polymer of this invention using the urethane-containing diacrylate of Example V.

About 4.6 grams of the urethane-containing diacrylate of Example V, about 3.7 grams of 1,4.cyclohexanebis(methylacetoacetate) of Example II, and about 0.05 gram of a 40% by weight benzyltrimethyl ammonium methoxide in methanol catalyst solution were added to a reaction vessel at room temperature, with stirring.

The resulting polymer mixture was transferred to an aluminum dish and allowed to cure for about 16 hours at a temperature of about 60° C.

The resulting cured polymer was removed from the aluminum dish and found to be tack-free, soft and tough with a Tg of about 0° C.

EXAMPLE XIX

This example demonstrates the preparation of a thermoplastic floor covering coated with a wear layer composition comprising a cross-linked acrylate-acetoacetate copolymer of this invention.

About 18 grams of the 50—50 mixture of urethane-containing diacrylates of Example VI, about 10.1 grams of the 1,4-cyclohexanebis(methylacetoacetate) of Example II, about 0.2 gram of a 30% by weight polyethylene oxide siloxane surfactant (Dow Corning "DC-193") in methanol solution, about 4.5 grams of methylene chloride and about 0.6 gram of a 40% by weight benzyltrimethyl ammonium methoxide in methanol catalyst solution were added to a mixing vessel with stirring at room temperature.

The resulting wear layer composition was applied using a Bird applicator to a thickness of 0.003 inch on a 12"×12" white vinyl tile and cured at 90° C. for about 30 minutes.

The resulting cured acrylate-acetoacetate polymer wear layer on the tile was observed to be clear and colorless.

The wear layer coated tile was tested for gloss retention using an art recognized traffic wheel test. The initial gloss value, before testing, was 88. After 30 minutes of testing, the gloss value was 29. After 60 minutes of testing, the gloss value was 15. The wear layer was found to have a midpoint Tg of 36° C. and was also tested by Instron measurement and found to have a tensile strength of 4443 psi and a percent elongation at break of 203%.

EXAMPLE XX

This example demonstrates the peparation of a thermoplastic floor covering coated with a wear layer composition comprising a cross-linked acrylate-acetoacetate copolymer of this invention.

About 20.3 grams of the 50—50 mixture of urethane-containing diacrylates of Example VI, about 9.8 grams of the 1,4-cyclohexanebis (methylacetoacetate) of Example II, about 0.2 gram of a 30% by weight polyethylene oxide siloxane surfactant (Dow Corning "DC-193") in methanol solution, about 6 grams of methylene chloride and about 0.6 gram of a 40% by weight benzyltrimethyl ammonium methoxide in methanol catalyst solution were added to a mixing vessel with stirring at room temperature.

The resulting wear layer composition was applied using a conventional applicator, in this example a Bird applicator, to a thickness of 0.003 inch on a 12"×12" white vinyl tile and cured at 90° C. for about 30 minutes.

The resulting cured acrylate-acetoacetate polymer wear layer on the tile was observed to be clear and colorless.

The wear layer coated tile was tested for gloss retention using an art recognized traffic wheel test. The initial gloss value, before testing, was 91. After 30 minutes of testing, the gloss value was 17. After 60 minutes of testing, the gloss value was 11. The wear layer was found to have a midpoint Tg of 42° C. and was also tested by Instron measurement and found to have a tensile strength of 6071 psi and a percent elongation at break of 5%.

EXAMPLE XXI

This example demonstrates the preparation of a thermoplastic floor covering coated with a wear layer composition comprising a cross-linked acrylate-acetoacetate copolymer of this invention.

About 19.7 grams of the 50—50 mixture of urethane-containing diacrylates of Example VI, about 11.1 grams of the 1,4-cyclohexanebis (methylacetoacetate) of Example II, about 1.2 grams of polyethyleneglycol 200 diacrylate, about 0.24 gram of a 30% by weight polyethylene oxide siloxane surfactant (Dow Corning "DC-193") in methanol solution, about 5 grams of methylene chloride, about 0.9 gram of a UV stabilizer (ethyl diphenylacrylate), designated "Uvinul N-35" commercially available from GAF Corporation, and about 0.5 gram of a 40% by weight benzyltrimethyl ammonium methoxide in methanol catalyst solution were added to a mixing vessel with stirring at room temperature.

The resulting wear layer composition was applied using a conventional applicator, in this example a Bird applicator, to a thickness of 0.003 inch on a 12"×12" white vinyl tile and cured at 90° C. for about 30 minutes.

The resulting cured acrylate-acetoacetate polymer wear layer on the tile was observed to be clear and colorless.

The wear layer coated tile was tested for gloss retention using an art recognized traffic wheel test. The initial gloss value, before testing, was 87. After 30 minutes of testing, the gloss value was 64. After 60 minutes of testing, the gloss value was 58. The wear layer was found to have a midpoint Tg of 33° C. and was also tested by Instron measurement and found to have a tensile strength of 2471 psi and a percent elongation at break of 206%.

EXAMPLE XXII

This example demonstrates the preparation of a thermoplastic floor covering coated with a wear layer composition comprising a cross-linked acrylate-acetoacetate copolymer of this invention.

About 18.6 grams of the 50—50 mixed urethane-containing diacrylates of Example VI, about 11.4 grams of the 1,4-cyclohexane bis(methylacetoacetate) of Example II, about 2.5 grams of polyethyleneglycol 200 diacrylate, about 0.24 gram of a 30% by weight polyethylene oxide silioxane surfactant (Dow Corning "DC-193") in methanol solution, about 7 grams of methylene chloride, about 0.6 grams Uvinul N-35", and about 0.7 gram of a 40% by weight benzyltrimethyl ammonium methoxide in methanol catalyst solution were added to a mixing vessel with stirring at room temperature.

The resulting wear layer composition was applied using a conventional applicator, in this example a Bird applicator, to a thickness of 0.003 inch on a 12"×12" white vinyl tile and cured at 90° C. for about 30 minutes.

The resulting cured acrylate-acetoacetate polymer wear layer on the tile was observed to be clear and colorless.

The wear layer coated tile was tested for gloss retention using an art recognized traffic wheel test. The initial gloss value, before testing, was 89. After 30 minutes of testing, the gloss value was 76. After 60 minutes of testing, the gloss value was 53. The wear layer was found to have a midpoint Tg of 29° C. and was also tested by Instron measurement and found to have a tensile strength of 3595 psi and a percent elongation at break of 321%.

It will be evident from the foregoing that various modifications can be made to the present invention. Such, however, are considered as being within the scope of this invention.

What is claimed is:

1. A cross-linked acrylate-acetoacetate polymer produced by the reaction of at least one polyfunctional acrylate with at least one diacetoacetate in the presence of a catalyst capable of promoting the reaction between the polyfunctional acrylate and the diacetoacetate.

2. The cross-linked polymer of claim 1 in which said polyfunctional acrylate has the formula

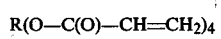

wherein R represents

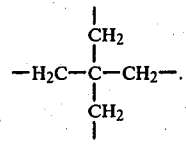

3. The cross-linked polymer of claim 1 in which said polyfunctional acrylate has the formula

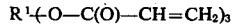

wherein $R^1$ represents

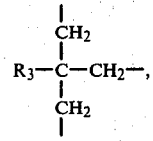

and $R_3$ represents hydrogen or ($C_1$ to $C_3$) alkyl.

4. The cross-linked polymer of claim 1 in which said polyfunctional acrylate has the formula

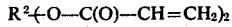

wherein $R^2$ represents: a ($C_1$ to $C_{10}$) alkylene group, a ($C_1$ to $C_4$) alkyl substituted ($C_1$ to $C_{10}$) alkylene group,

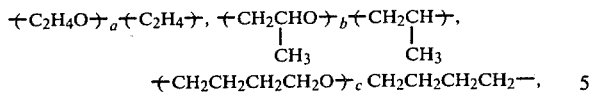

a cycloalkylene group, a cycloalkane bearing two (C₁ to C₃) alkylene groups,

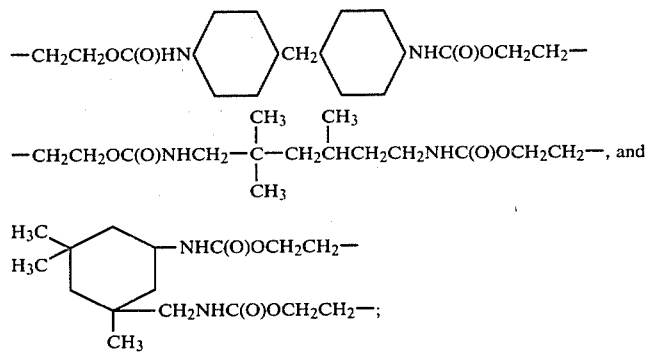

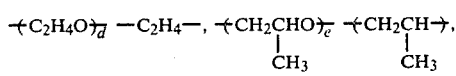

a is an integer from 1 to 20; b is an integer from 1 to 10; and c is an integer from 1 to 5.

5. The cross-linked polymer of claim 1 in which said diacetoacetate has the formula $$R^4(-O-C(O)-CH_2-C(O)-CH_3)_2$$

wherein R⁴ represents: a (C₁ to C₁₀) alkylene group, a (C₁ to C₄) alkyl substituted (C₁ to C₁₀) alkylene group,

a cycloalkylene group, a cycloalkane bearing two (C₁ to C₃) alkylene groups, and —H₆C₃O(—C₂H₄O—)$_d$—(C₂-H₄—)$_f$OC₃H₆—, d is an integer from 1 to 6; e is an integer from 1 to 6; and f is an integer from 1 to 4.

6. The cross-linked polymer of claim 2 in which said polyfunctional acrylate is reacted with the diacetoacetate in a mole ratio of from about ½ to about 1 mole of diacrylate to about 1 mole of diacetoacetate.

7. The cross-linked polymer of claim 3 in which said polyfunctional acrylate is reacted with the diacetoacetate in a mole ratio of from about ⅔ to about 1⅓ moles of triacrylate to about 1 mole of diacetoacetate.

8. The cross-linked polymer of claim 4 in which said polyfunctional acrylate is reacted with the diacetoacetate in a mole ratio of from about 1 to about 2 moles of tetraacrylate to about 1 mole of diacetoacetate.

9. The cross-linked polymer of claim 1 wherein said catalyst is a strong basic catalyst.

10. A thermoplastic floor covering coated with a wear layer composition comprising a cross-linked acrylate-acetoacetate polymer produced by the reaction of at least one polyfunctional acrylate with at least one diacetoacetate in the presence of a catalyst capable of promoting the reaction between the polyfunctional acrylate and the diacetoacetate.

11. The thermoplastic floor covering of claim 10 in which said polyfunctional acrylate has the formula $$R(-O-C(O)-CH=CH_2)_4$$

wherein R represents

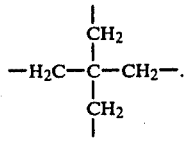

12. The thermoplastic floor covering of claim 10 in which said polyfunctional acrylate has the formula $$R^1(-O-C(O)-CH=CH_2)_3$$

wherein R¹ represents

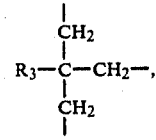

and R₃ represents hydrogen or (C₁ to C₃) alkyl.

13. The thermoplastic floor covering of claim 10 in which said polyfunctional acrylate has the formula $$R^2(-O-C(O)-CH=CH_2)_2$$

wherein R² represents: a (C₁ to C₁₀) alkylene group, a (C₁ to C₄) alkyl substituted (C₁ to C₁₀) alkylene group,

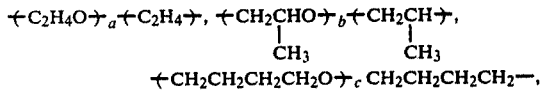

a cycloalkylene group, a cycloalkane bearing two (C₁ to C₃) alkylene groups,

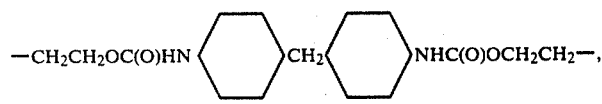

-continued

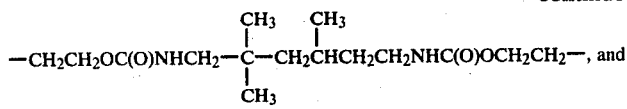, and

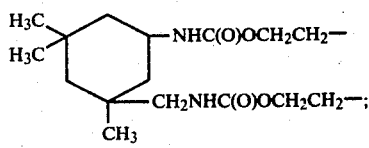

a is an integer from 1 to 20; b is an integer from 1 to 10; and c is an integer from 1 to 5.

14. The thermoplastic floor covering of claim 10 in which said diacetoacetate has the formula $$R^4(O-C(O)-CH_2-C(O)-CH_3)_h$$

wherein $R^4$ represents: a ($C_1$ to $C_{10}$) alkylene group, a ($C_1$ to $C_4$) alkyl substituted ($C_1$ to $C_{10}$) alkylene group,

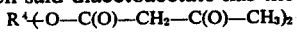

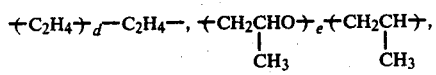

a cycloalkylene group, a cycloalkane bearing two ($C_1$ to $C_3$) alkylene groups, and $-H_6C_3O(C_2H_4O)_f(C_2H_4)OC_3H_6-$, d is an integer from 1 to 6; e is an integer from 1 to 6; and f is an integer from 1 to 4.

15. The thermoplastic floor covering of claim 11 in which said polyfunctional acrylate is reacted with the diacetoacetate in a mole ratio of from about ½ to about 1 mole of diacrylate to about 1 mole of diacetoacetate.

16. The thermoplastic floor covering of claim 12 in which said polyfunctional acrylate is reacted with the diacetoacetate in a mole ratio of from about ⅔ to about 1⅓ moles of triacrylate to about 1 mole of diacetoacetate.

17. The thermoplastic floor covering of claim 13 in which said polyfunctional acrylate is reacted with the diacetoacetate in a mole ratio of from about 1 to about 2 moles of tetraacrylate to about 1 mole of diacetoacetate.

18. The thermoplastic floor covering of claim 10 wherein said catalyst is a strong basic catalyst.

* * * * *